United States Patent [19]
Tutt

[11] Patent Number: 5,549,058
[45] Date of Patent: Aug. 27, 1996

[54] METHOD AND APPARATUS FOR CHARGING A BULK MATERIAL SUPPLEMENTAL FUEL INTO A LONG CEMENT KILN

[75] Inventor: James R. Tutt, Nash, Tex.

[73] Assignees: Cadence Environmental Energy, Inc., Michigan City, Ind.; Ash Grove Cement Company, Overland Park, Kans.

[21] Appl. No.: 418,660

[22] Filed: Apr. 10, 1995

[51] Int. Cl.⁶ ................... F23D 14/00; F27B 7/00
[52] U.S. Cl. ............. 110/226; 110/246; 110/109; 110/289; 110/346; 414/194; 414/149; 432/103
[58] Field of Search ................... 110/226, 246, 110/109, 289, 346; 432/103, 108; 414/149, 194

[56] References Cited

U.S. PATENT DOCUMENTS

| | | | |
|---|---|---|---|
| 2,484,911 | 10/1949 | Seil | 263/33 |
| 2,617,545 | 11/1952 | Campbell | 214/18 |
| 2,813,822 | 11/1952 | Collier | 202/6 |
| 3,357,689 | 12/1967 | Arnesen et al. | 263/33 |
| 4,419,943 | 12/1983 | Faurholdt | 110/237 |
| 4,466,361 | 8/1984 | Henery et al. | 110/346 |
| 4,850,290 | 7/1989 | Benoit et al. | 110/346 |
| 4,921,538 | 5/1990 | Lafser, Jr.; et al. | 106/100 |
| 4,930,965 | 5/1990 | Peterson et al. | 414/149 |
| 4,984,983 | 1/1991 | Enkegaard | 432/14 |
| 5,086,716 | 2/1992 | Lafser, Jr. | 110/345 |
| 5,257,586 | 11/1993 | Davenport | 110/246 |
| 5,273,355 | 12/1993 | May et al. | 110/246 |
| 5,377,603 | 1/1995 | Reese et al. | 110/346 |
| 5,454,715 | 10/1995 | Hansen et al. | 432/103 |

FOREIGN PATENT DOCUMENTS

| | | |
|---|---|---|
| 3109781A1 | 9/1982 | Germany. |
| 527392 | 9/1976 | U.S.S.R.. |
| 857043 | 8/1981 | U.S.S.R.. |
| 1647211A1 | 5/1991 | U.S.S.R.. |
| 945119 | 7/1992 | U.S.S.R.. |

OTHER PUBLICATIONS

"Modernization Of Rotary Furnaces For Burning Used Automobile Tires", V. I. Shubin, et al., 1989.
"Modernization Of Rotary Kilns Under The Wet Method Of Cement Production", V. A. Kulabukhov, et al., 1985.

*Primary Examiner*—Noah P. Kamen
*Attorney, Agent, or Firm*—Barnes & Thornburg

[57] ABSTRACT

A method and apparatus for feeding a bulk material supplemental fuel through a port formed in a side wall of a rotary vessel of a cement kiln. The apparatus includes a stationary annular plenum surrounding rotary vessel. The plenum is configured to define an enclosed interior region in communication with the port in the rotary vessel. The apparatus also includes a bulk material fuel charging apparatus including a hopper for receiving the bulk material, and a barrel in communication with the hopper. The barrel has an open discharge end extending into the interior region of the annular plenum. The bulk material fuel charging apparatus also includes an air cannon in air flow communication with the barrel for injecting air into the barrel to force a portion of the bulk material located in the barrel out of the open discharge end of the barrel, through the port, and into the rotary vessel.

35 Claims, 3 Drawing Sheets

METHOD AND APPARATUS FOR CHARGING A BULK MATERIAL SUPPLEMENTAL FUEL INTO A LONG CEMENT KILN

BACKGROUND AND SUMMARY OF THE INVENTION

This invention relates to a method and apparatus for the improved manufacture of cement in wet or dry process long rotary kilns, or in preheater kilns, for processing a mineral material therein to produce cement clinker. More particularly this invention is directed to improvements in the operation and configuration of long rotary cement kilns to permit burning of a bulk material supplemental fuel in a secondary burning zone of the kiln.

In the widely used commercial process for the manufacture of cement, the steps of drying, calcining, and clinkering cement raw materials are accomplished by passing finely divided raw materials, including calcareous minerals, silica and alumina, through a heated, inclined rotary vessel or kiln. In what is known as conventional long dry or wet process kilns the entire mineral heating process is conducted in a heated rotating kiln cylinder, commonly referred to as a "rotary vessel". The rotary vessel is typically 10 to 15 feet in diameter and 400–700 feet in length and is inclined so that as the vessel is rotated, raw materials fed into the upper end of the kiln cylinder move under the influence of gravity toward the lower "fired" end where the final clinkering process takes place and where the product cement clinker is discharged for cooling and subsequent processing. Kiln gas temperatures in the fired clinkering zone of the kiln range from about 1300° to about 1600° C. Kiln gas temperatures are as low as about 250° to 350° C. at the upper mineral receiving end of so-called wet process kilns. Somewhat higher kiln gas temperatures exist in the upper end of long dry process kilns.

Generally, skilled practitioners consider the cement making process within the rotary kiln to occur in several stages as the raw material flows from the cooler gas exit mineral feed end to the fired/clinker exit lower end of the rotary kiln vessel. As the mineral material moves down the length of the kiln it is subjected to increasing kiln gas temperatures. Thus in the upper portion of the kiln cylinder where the kiln gas temperatures are the lowest, the in-process mineral materials first undergo a drying process and thereafter move down the kiln cylinder until the temperature is raised to calcining temperature. The length of the kiln where the mineral is undergoing a calcining process (releasing carbon dioxide) is designated the calcining zone. The in-process mineral finally moves down the kiln where the kiln into a zone where gas temperatures are the hottest, the clinkering zone adjacent the fired lower end of the kiln cylinder. The drying zone, the calcining zone, and the clinkering zone typically are not contiguous lengths along the kiln cylinder. The kiln gas stream flows counter to the flow of in-process mineral materials from the clinkering zone, through the intermediate calcining zone and the mineral drying zone and out the upper gas exit end of the kiln into a kiln dust collection system. The flow of kiln gases through the kiln can be controlled to some extent by a draft induction fan positioned in the kiln gas exhaust stream.

Cement kilns have received favorable review from both federal and state environmental regulatory agencies for disposal of both liquid and solid combustible waste materials. Cement kilns provide a combination of high operating temperatures and long residence times, both of which are favorable conditions for complete combustion of organic components of waste and chemical combination of inorganic components with the reactive in-process mineral components. Combustible waste solids provide a source of inexpensive energy for the mineral processing industry.

For many years, regulation compliant use and disposal of waste in operating kilns was limited to combustible liquid or "pumpable" hazardous waste. Liquid waste materials are easily blended with each other and with conventional fuels to provide homogeneous liquids that can be burned in the gaseous phase at the firing end of the kiln with little or no modification of kiln burner configuration. Solid waste derived fuel, however, can occur in multiplicity of forms, from hard crystalline solids to viscous, sticky sludges. They are not easily blended, and they present significant engineering challenges for their safe handling and delivery into rotating kilns.

Several apparatus have been designed to facilitate firing of solid wastes into kilns. See, for example, U.S. Pat. No. 4,850,290, issued Jul. 25, 1989; U.S. Pat. No. 4,930,965, issued Jun. 5, 1990; U.S. Pat. No. 4,974,529, issued Dec. 4, 1990; and U.S. Pat. No. 5,083,516 issued Jan. 7, 1992; incorporated herein by reference. These four patents describe an apparatus and method for delivering containerized waste to both pre-heater type and conventional long wet or dry kilns at the point in the process where the kiln gas temperature is such that volatilized components are consumed with high destruction and removal efficiency. The above-cited patents describe a device for delivering containerized waste through the wall of a kiln cylinder during kiln operation. The apparatus comprises a fuel charging port, preferably with a mechanical closure, formed in the kiln cylinder wall. The fuel charging port is aligned with a drop tube inside the kiln cylinder. The drop tube prevents hot in-process mineral material in the kiln from escaping through the fuel charging port or contacting closure. The device is utilized to deliver containerized waste into a secondary burning zone of the kiln at predetermined time during kiln cylinder rotation.

Other apparatus and methods for delivering solid fuels, especially solid waste derived fuels, are known in the art. See, for example, U.S. Pat. No. 5,078,594, issued Jan. 7, 1992. The '594 patent discloses a charging apparatus for delivering tires or other combustible waste solids through a port into a rotating kiln. U.S. Pat. No. 5,339,751 owned by the assignees of the present invention discloses a waste derived fuel delivery control method and apparatus capable of charging more than one container or other type of solid waste fuel into the kiln for each revolution of the kiln. In addition, containerized solid waste derived fuel can be fired from an industrial cannon mounted at the lower fired end of the kiln into the secondary burning zone of the kiln. See U.S. Pat. Nos. 5,086,716 and 4,984,983 for examples of industrial cannon fuel delivery systems.

Packaging the solid waste derived fuel into suitable containers for charging into the kiln adds a significant amount to the cost of delivering supplemental fuel to the kiln. Substantial cost savings are obtained by charging the bulk material directly into the kiln without first placing the bulk material into containers.

Attempts have been made to deliver an uncontainerized bulk material supplemental fuel to a kiln. U.S. Pat. No. 5,257,586 discloses one such supplemental fuel delivery apparatus. The '586 patent discloses a feed mechanism including an auger screw which rotates with the kiln. The feed mechanism of the '586 patent scoops up material from a transfer drum during rotation of the kiln and the auger screw forces the material into the kiln through a discharge tube. A feed hopper including a knife gate and a hydraulic ram may also be used to load an inlet of the feeding mechanism disclosed in the '586 patent.

One object of the present invention is to provide an improved bulk material charging apparatus to facilitate charging of bulk fuel material directly into a rotating kiln without the need for containerizing the bulk material, thereby substantially reducing packaging costs associated with delivering a supplemental fuel into the rotating kiln.

The apparatus and method of the present invention provides an improvement for handling bulk materials on site at the kiln and for charging the bulk material directly into the kiln. The present apparatus and method facilitates handling of the bulk material. The apparatus is designed to have minimal interference on the physical operation of the kiln. The apparatus advantageously permits bulk feeding of a supplemental fuel, such as a solid waste derived fuel (SWDF), into the rotary vessel of the kiln using conventional mechanical equipment.

Burning a supplemental fuel, either a natural fossil fuel such as lump coal or a waste derived fuel, charged into the kiln reduces fuel consumption of the burner at the lower fired end of the kiln. Environmentally sound burning requires complete combustion of the supplemental fuel. The goal is to optimize combustion conditions to minimize discharge of carbon monoxide and other products of incomplete combustion into the atmosphere. Carbon monoxide is produced as a result of incomplete combustion. Optimal combustion conditions also reduce discharge of organic residues from waste derived fuels from the lower fired end of the kiln in the clinker.

Another object of the present invention is to improve combustion efficiency within a secondary burning zone of the kiln by providing multiple fuel charges for each revolution of the rotary vessel and by providing high velocity tertiary or mixing air with each fuel charge into the secondary burning zone.

It is understood that the bulk material supplemental fuel charging apparatus of the present invention can be used along with a conventional charging apparatus for charging containerized solid waste derived fuel into the rotary vessel. The use of the combination of the present invention with the conventional containerized fuel charging apparatus would reduce the amount of containerized supplemental fuel required and thereby still substantially reduce packaging costs associated with delivering such supplemental fuel to the kiln.

According to one aspect of the present invention, an apparatus is provided for improved manufacture of cement clinker in a wet or dry process long rotary kiln for processing a mineral material therein to produce cement clinker. The kiln includes a rotary vessel having a fired lower end and an adjacent clinkering zone, an upper kiln gas exit end and an adjacent mineral drying zone, an intermediate calcining zone along its length, and a kiln gas stream flowing from the fired lower end to the upper gas exit end. The kiln is modified to burn a bulk material supplemental fuel in a secondary burning zone of the kiln. The apparatus of the present invention includes a port formed in the rotary vessel upstream relative to kiln gas flow of the drying zone, a tube extending into the rotary vessel in communication with the port to prevent an in-process mineral material in the rotary vessel from escaping through the port, and a bulk material fuel charging apparatus. The charging apparatus includes a hopper for receiving the bulk material, a barrel in communication with the hopper, a cylinder having a piston for moving a ram located within the hopper from a retracted position to an extended position to load a portion of the bulk material into the barrel and form a fuel charge, and an air cannon in air flow communication with the barrel for injecting air into the barrel to force the fuel charge out of the barrel, through the tube, and into an interior region of the rotary vessel.

In the illustrated embodiment, the apparatus also includes a compaction cylinder coupled to the charging apparatus. The compaction cylinder includes a piston and a compaction ram coupled to the piston. The compaction ram is located inside the hopper for compacting the bulk material in the hopper as the compaction ram is moved from a retracted position to an extended position by the compaction cylinder.

Also in the illustrated embodiment, the apparatus includes a stationary annular plenum surrounding rotary vessel. The plenum is configured to define an enclosed interior region in communication with a discharge end of the barrel of the charging apparatus and with the port in the rotary vessel. A storage container is located adjacent the kiln for storing the bulk material, and a conveyor is provided for transporting the bulk material from the storage container to the hopper of the fuel charging apparatus. A second conveyor is also provided for transporting bulk material from inside the annular plenum to the storage container for reloading back into the hopper of the charging apparatus.

A fan is coupled to the annular plenum and a filter is coupled to the fan. The fan withdraws air from the interior region of the annular plenum through the filter. Illustratively, the filter is an activated carbon filter.

The apparatus further includes a target plate coupled to the rotary vessel and a sensor for detecting a position of the target plate. The sensor activates the air cannon when the tube is aligned with the barrel of the charging apparatus. A valve is preferably coupled to the tube for selectively opening and closing the tube to permit the fuel charge to pass through the tube and into the interior region of the rotary vessel.

Optionally, the apparatus may include a second bulk material fuel charging apparatus for charging another fuel charge through the tube during rotation of the rotary vessel. The apparatus may also include a second port formed in the rotary vessel angularly spaced from the first port, and a second tube extending into the rotary vessel in communication with the second port to provide a second fuel delivery tube for the first and second bulk material fuel charging apparatus. Illustratively, the second bulk material fuel charging apparatus includes a second hopper for receiving the bulk material, a second barrel in communication with the second hopper, a second cylinder having a piston for moving a ram located within the second hopper from a retracted position to an extended position to load a portion of the bulk material into the second barrel and form a fuel charge, and a second air cannon in air flow communication with the second barrel for injecting air into the second barrel to force the fuel charge out of the second barrel, through the tube, and into the interior region of the rotary vessel.

The barrel of the fuel charging apparatus includes an open discharge end. The barrel is preferably angled upwardly to prevent the bulk material from exiting the barrel and hopper through the open discharge end of the barrel. The barrel has a predetermined diameter which is smaller than a diameter of the tube.

According to another aspect of the present invention, an apparatus is provided for feeding a bulk material supplemental fuel through a port formed in a side wall of a rotary vessel of a cement kiln. The apparatus includes a stationary annular plenum surrounding rotary vessel. The plenum is configured to define an enclosed interior region in communication with the port in the rotary vessel. The apparatus also includes a bulk material fuel charging apparatus including a hopper for receiving the bulk material, and a barrel in communication with the hopper. The barrel has an open discharge end extending into the interior region of the annular plenum. The bulk material fuel charging apparatus also includes an air cannon in air flow communication with the barrel for injecting air into the barrel to force a portion of the bulk material located in the barrel out of the open discharge end of the barrel, through the port, and into the rotary vessel.

In the illustrated embodiment, the charging apparatus includes a chambering cylinder coupled to the hopper. The cylinder controls a piston to move a chambering ram located within the hopper from a retracted position to an extended position to load the portion of the bulk material from the hopper into the barrel to form a fuel charge. The apparatus also includes a compaction cylinder coupled to the charging apparatus. The compaction cylinder includes a piston and a compaction ram coupled to the piston. The compaction ram is located inside the hopper for compacting the bulk material in the hopper as the compaction ram is moved from a retracted position to an extended position by the compaction cylinder.

According to yet another aspect of the present invention, a method is provided for improving the manufacture of cement clinker in a conventional long rotary cement kiln comprising a rotary vessel having an upper kiln gas exit end with an adjacent mineral drying zone, and opposite fired clinker exit end with an adjacent clinkering zone and an intermediate mineral calcining zone. During operation, a kiln gas stream flows from said clinkering zone through the calcining zone and out the kiln gas exit end of the rotary vessel. An in-process mineral flows from the drying zone through the clinkering zone. The method includes the steps of forming a port in the rotary vessel at a predetermined location along a longitudinal axis of the rotary vessel upstream relative to kiln gas flow of the drying zone, positioning a barrel of a bulk material fuel charging apparatus at said predetermined location aligned with the port, loading a bulk material into the barrel to form a fuel charge, and supplying high pressure air to the barrel when the port is aligned with the barrel to eject the fuel charge from the barrel, through the port, and into an interior region of the rotary vessel.

In the illustrated method, the loading step includes the steps of loading the bulk material into a hopper in communication with the barrel, compacting the bulk material inside the hopper, and forcing a portion of the bulk material from the hopper and into the barrel to form the fuel charge. The method also includes the step of detecting when the port is aligned with the barrel to control timing of the air supplying step.

The illustrated method further includes the step of forming an enclosed air chamber surrounding rotary vessel. The enclosed air chamber is in communication with a discharge end of the barrel and with the port formed in the rotary vessel. The method still further includes the step of withdrawing air from the enclosed air chamber through a filter.

Additional objects, features and advantages of the invention will become apparent to those skilled in the art upon consideration of the following detailed description of the preferred embodiments exemplifying the best mode of carrying out the invention as presently perceived.

DETAILED DESCRIPTION OF THE INVENTION

This invention relates to an apparatus and method for improving the combustion efficiency and efficiency of fuel utilization in an operating rotary kiln by modifying the kiln to burn a bulk material supplemental fuel while reducing emissions from the kiln. The present invention also permits environmentally sound disposal of combustible solid wastes in an operating rotary kiln. Rotary kilns can be of the conventional type or of the so-called pre-heater or pre-calcinator type. Common to each, however, is a heated, rotating cylinder containing in-process mineral material. In the widely used commercial process for the production of cement clinker, cement raw materials are calcinated and "clinkered" by passing finely divided raw materials through a rotating inclined rotary vessel or kiln cylinder. The requisite temperature for processing the mineral material is achieved by burning fuel such as gas, fuel oil, powdered coal, and the like in the gaseous atmosphere at the lower end of the kiln with gases moving countercurrent to the solids through the rotating kiln cylinder. With the high temperatures required for the process, fuel costs constitute a significant factor in the ultimate cost of the product. It is known that fuel costs can be reduced through burning of a supplemental fuel into a secondary burning zone of the rotary vessel. Such supplemental fuel may be either a natural fossil fuel such as lump coal, pumpable liquid hazardous fuels, or solid waste materials charged into the secondary burning zone.

One form of hazardous waste which has been successfully utilized in this process is a by-product of the production of liquid waste fuels already marketed by Cadence Environmental Energy Inc. under the name CHEM FUEL® for burning in kiln operations. The solid hazardous waste by-products consist of non-volatile and non-extractable residues which consist principally of high molecular weight resins, polymers and residual volatiles. Preferably, the hazardous waste containerized for use in the present process should have a BTU value of greater than 5,000 BTUs/lb. Free liquids in the solid waste material should be minimized. If present, they may be absorbed using an organic absorbent material such as ground corn cobs or similar BTU contributing material.

Sealable containers for the hazardous waste should be fully compliant with applicable Department of Transportation standards for containment/shipment of hazardous waste materials. Sealable steel pales or drums are preferred. The container contributes both energy (iron is oxidized in the higher temperature zones near the discharge end of the kiln) and material (iron oxides) to the process chemistry. Other containers such as fiber and plastic containers may also be used. The size of the containers is dependent on the energy value of the hazardous waste targeted for disposal and the capacity of the kiln to receive such containers.

Packaging the hazardous waste material into suitable containers adds substantial packaging costs. This packaging cost substantially increases the overall cost of charging the supplemental fuel into the secondary burning zone of the kiln. The present invention advantageously provides a method and apparatus for charging bulk material directly into the kiln without first having to put the bulk material into containers. Therefore, the packaging costs required for containerizing the bulk material is substantially reduced or eliminated.

Figure 1:
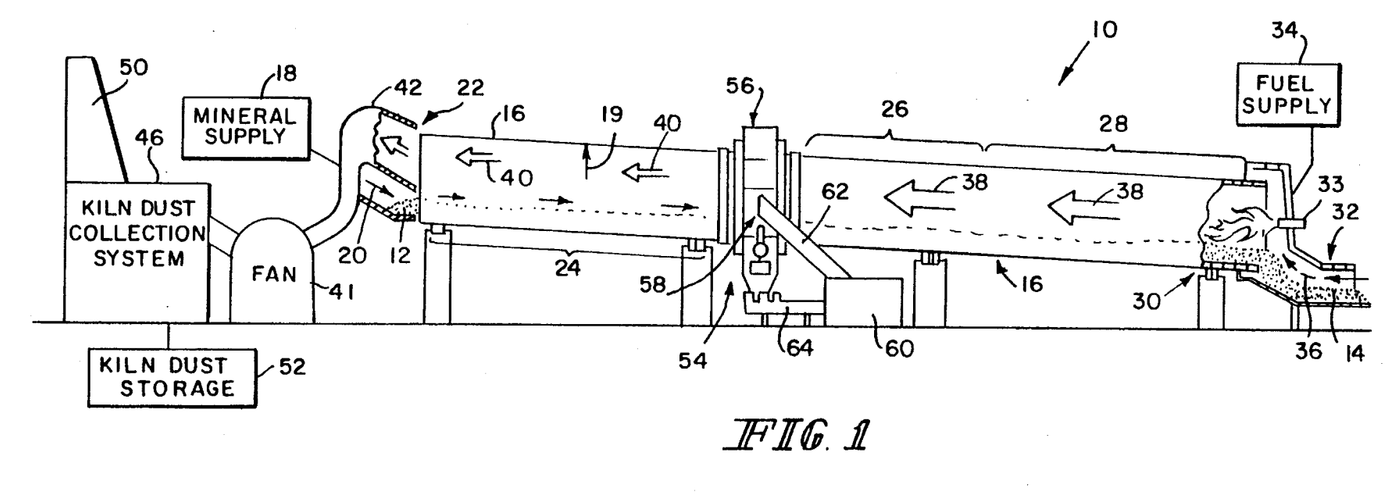
FIG. 1 is a diagrammatical view of an improved rotary kiln in accordance with the present invention showing mineral flow in a downhill direction through the drying, calcining, and clinkering zones in a rotary vessel, hot kiln gas flow in an uphill direction in the rotary vessel, and a bulk material fuel charging apparatus of the present invention for charging a supplemental fuel into the rotary vessel.

An improved long rotary kiln 10 for converting mineral materials 12 into cement clinker 14 is illustrated in FIG. 1. The kiln 10 includes an inclined rotary vessel 16 and means (not shown) for rotating the rotary vessel 16 about its longitudinal axis. Mineral materials 12 from mineral supply 18 are charged into mineral inlet 20 at upper end 22 of the rotary vessel 16. As rotary vessel 16 is rotated, mineral materials 12 move under the influence of gravity through a mineral drying/pre-heat zone 24, a calcining zone 26, and a clinkering zone 28 before being discharged as cement clinker 14 from a lower end 30 of rotary vessel 16 into cooling chamber 32. Rotary vessel 16 is typically 10–15 feet or more in diameter and 400–700 feet in length and is inclined. Rotary vessel 16 is rotated about its longitudinal axis at a rate of about 1 to 3 times per minute in the director of arrow 19 in FIG. 1.

Fuel from fuel supply 34 is combined with primary combustion air and burned suing burner 33, secondary combustion air is pre-heated as it is drawn through cooling chamber 32 in the direction of arrow 36.

The hot kiln gas stream illustrated by arrows 38 and 40 generated by fuel combustion at burner 33 in clinkering zone 28 flows toward upper end 22 of rotary vessel 16 under influence of negative pressure created by fan 41. The kiln gas stream 40, after exiting upper end 22 of rotary vessel 16 is directed to kiln dust collection system 46 including an electrostatic precipitator or other suitable gas cleaning system to separate kiln dust into dust storage 52 and an environmentally acceptable air stream delivered into the atmosphere through stack 50.

A chain system or the like (not shown) is used to improve the efficiency of heat transfer from the hot kiln gases flowing through the mineral drying/pre-heat zone 24 to the mineral materials 12. The chains are exposed to the hot kiln gases and deliver heat to the mineral bed 12 during rotation of rotary vessel 16.

The configuration of the elements of the mineral feed components and the kiln gas processing components at the upper end 22 of rotary vessel 16 are well known those skilled in the art and it should be appreciated that such elements are shown diagrammatically in FIG. 1 to illustrate their relationship and cooperation in operation of rotary kiln 10. It will be understood that any of a wide variety of mineral loading and kiln gas handling systems may be incorporated into the kilns modified in accordance with the present invention.

Product clinker 14 is discharged from fired end 30 for cooling and subsequent processing. Temperatures in the fired clinkering zone of rotary vessel 16 range from about 1300° C. to about 1600° C. Gas temperatures in the kiln decrease to as low as 250°–350° C. at upper end 22 of so-called wet process kilns. Somewhat higher gas temperatures exist in the upper end 22 of dry process kilns.

A continuous emissions monitoring (CEM) system is provided in stack 50 to monitor the amount of solid materials discharged into the atmosphere. The continuous emissions monitoring system can discontinue firing of kiln 10 with hazardous waste if the amount of hazardous materials discharged through stack 50 exceeds regulatory limits.

Kiln 10 includes a bulk material feeding and charging apparatus 54 for charging a supplemental fuel into the calcining zone 26 or into a downstream portion relative to kiln gas flow of the clinkering zone 28. Charging apparatus 54 includes a stationary plenum 56 surrounding rotary vessel 16. Plenum 56 is sealed to rotary vessel 16 by leaf springs which are mounted on opposite lateral edges of annular plenum 56 in wiping and sealing contact with rotary vessel 16. Leaf seals are formed of one or more overlapping layers of stainless steel or mild steel leaves in a conventional manner.

A supplemental fuel charging apparatus 58 is provided for charging a bulk material supplemental fuel such as a solid waste drive fuel into the rotary vessel 16 during rotation of the rotary vessel 16. Advantageously, the bulk material does not need to be containerized. This feature provides substantial savings due to reduced packaging costs. The bulk material is loaded into a storage container 60 located adjacent kiln 10. The bulk material is transported to the charging apparatus 58 by conventional bulk material handling equipment such as closed conveyor 62 which prevents escape of the bulk material. A second closed conveyor 64 is provided beneath plenum 56 to transport any material which might fall into plenum 56 back to storage container 60.

Figure 2:
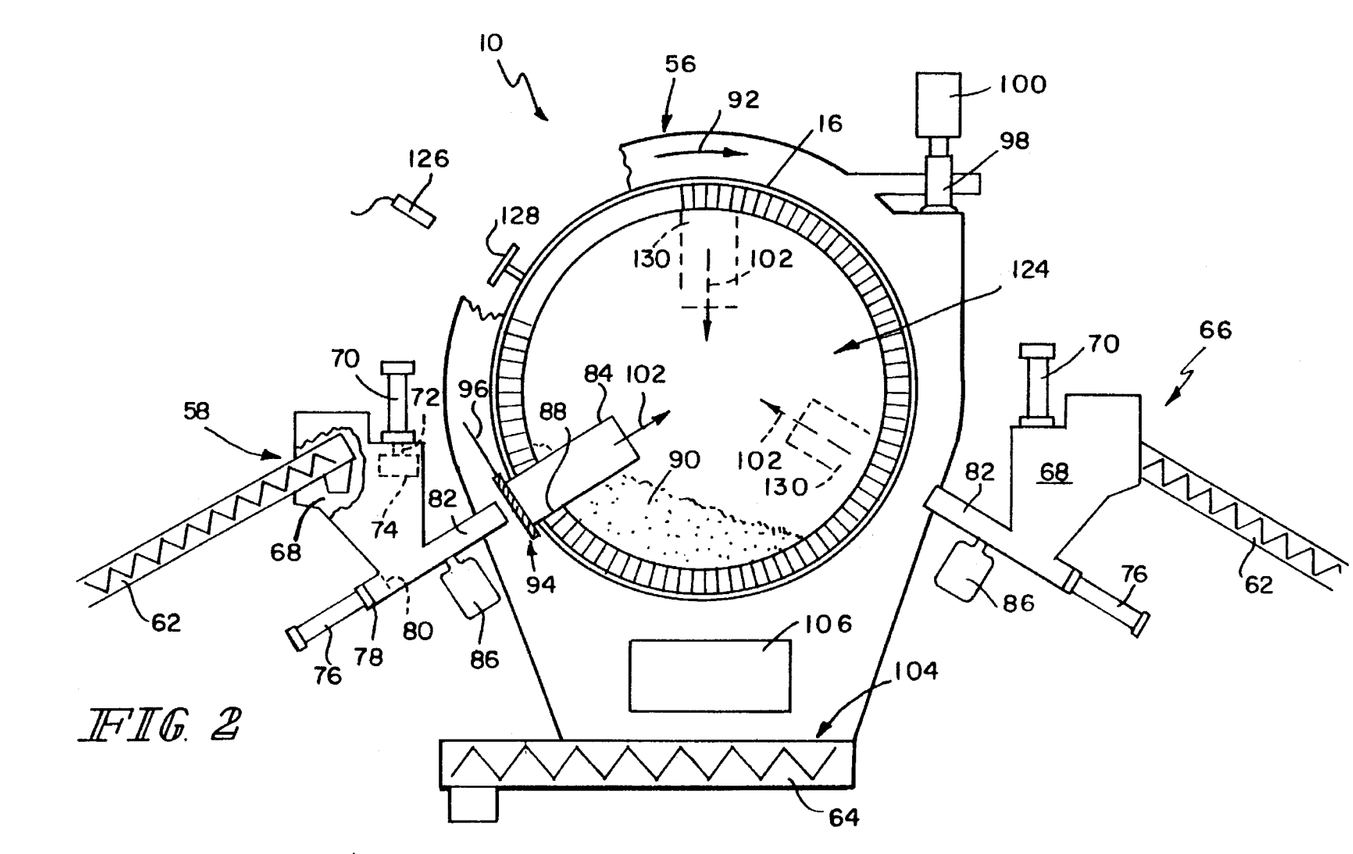
FIG. 2 is a diagrammatical sectional view taken through the bulk fuel charging apparatus of the present invention illustrating a stationary plenum surrounding the rotary vessel and first and second bulk material charging apparatus located on opposite sides of the rotary vessel for charging the supplemental bulk material fuel into the rotary vessel.

Details of plenum 56 and charging apparatus 58 are illustrated in FIG. 2. FIG. 2 also illustrates a second charging apparatus 66 mounted on an opposite side of kiln 10. Second charging apparatus 66 is optional and is identical to charging apparatus 58. Therefore, only the details of charging apparatus 58 will be described.

Charging apparatus 58 includes a loading hopper 68 for receiving bulk material from the conveyor 62. Charging apparatus 58 also includes a hydraulic compaction cylinder 70 which controls movement of a piston 72 coupled to a compaction ram 74 for compacting bulk material inside hopper 68. Charging apparatus 58 also includes a hydraulic chambering cylinder 76 which controls movement of a piston 78 coupled to a chambering ram 80. Cylinders 70 and 76 are operated using conventional hydraulic cylinder controls. Chambering ram 80 is used to force a bulk fuel material charge 109 (FIG. 5) into a barrel 82 of charging apparatus 58. The material charge 109 is then forced into rotary vessel 16 through a drop tube 84 by high pressure air from an air cannon 86. Illustratively, air cannon 86 a Big Blaster air cannon system available from Martin Engineering Company.

A drop tube 84 is in communication with a port 88 formed in rotary vessel 16. Drop tube 84 has a minimum length to prevent the in-process mineral material bed 90 from exiting through drop tube 84 as rotary vessel 16 rotates in the direction of arrow 92 of FIG. 2. The length of drop tube 84 is preferably as short as possible. This short length of drop tube 84 reduces collection of sticky bulk material within drop tube 84 while still preventing in-process material 90 from exiting through drop tube 84.

Preferably, plenum 56 is an air swept plenum. A fan 98 removes the air from plenum 56 through an activated carbon filter 100. Another suitable filter or means for removing VOC's upon discharge of air from plenum 56 may also be provided. Fan 98 creates a slight negative pressure within plenum. Preferably, barrel 82 is angled upwardly to retain the bulk material within hopper 68 and to prevent any liquids from escaping from hopper 68. The barrel 82 has a relatively small diameter compared to the diameter of drop tube 84. A valve 94 for drop tube 84 is normally closed. At the time of firing, valve 94 is opened by a cam system 96 in a conventional manner. Momentum of the high pressure air entering rotary vessel 16 in the direction of arrow 102 along with the supplemental fuel material charge 109 tends to carry air into the drop tube 84 and further captures flow due to the negative pressure inside rotary vessel 16.

Any loose waste material which fails to enter drop tube 84 is collected in a bottom portion 104 of plenum 56. A conventional material handling device such as closed conveyor 64 is provided to transport the collected bulk material back to storage container 60 in a closed loop manner so that the bulk material can be returned to loading hopper 68 by conveyor 62. An ample cleanout door 106 is provided for mechanical and operational inspection.

Figure 3:
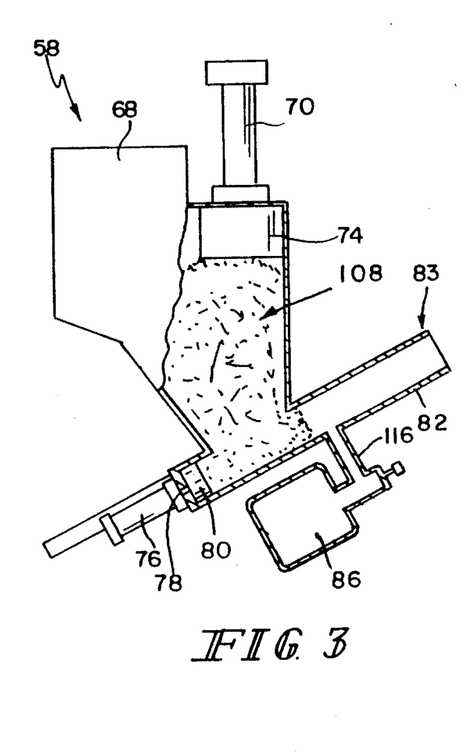
FIG. 3 is a diagrammatical sectional view taken through one bulk material fuel charging apparatus illustrating a compaction ram in a retracted position within a loading hopper and illustrating a chambering cylinder having a chambering ram in a retracted position.
Figure 4:
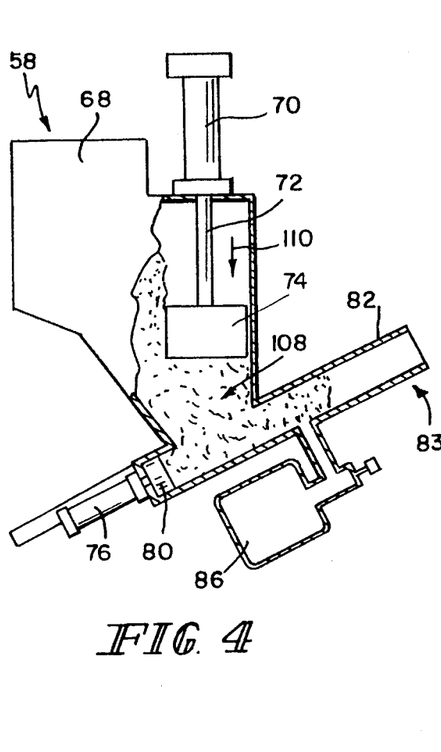
FIG. 4 is a diagrammatical sectional view similar to FIG. 3 illustrating the compaction ram in an extended position to compact the supplemental fuel within the loading hopper.

In operation, bulk material from storage container 60 is transported to loading hopper 68 by conveyor 62. Ram 74 of compaction cylinder 70 and ram 80 of chambering cylinder 76 are both in a retracted position as illustrated in FIG. 3 so that the material 108 fills hopper 68. Compaction cylinder 70 is then actuated to extend piston 72 and move compaction ram 74 downwardly in the direction of arrow 110 of FIG. 4 to compact the bulk material 108 in hopper 68. Next, compaction cylinder 70 is actuated to move ram 74 back to its retracted position in the direction of arrow 112 of FIG. 5 and chambering cylinder 76 is actuated to extend piston 78 and chambering ram 80 in the direction of arrow 114 of FIG. 5 to force a material charge 109 into barrel 82 of charging apparatus 58. Illustratively, ram 80 is extended past an inlet 116 connecting air cannon 86 to barrel 82 as illustrated at location 118. Barrel 82 is long enough so that the bulk material does not fall out an open end 83 of barrel 82 as chambering ram 80 is extended by chambering cylinder 76.

Figure 5:
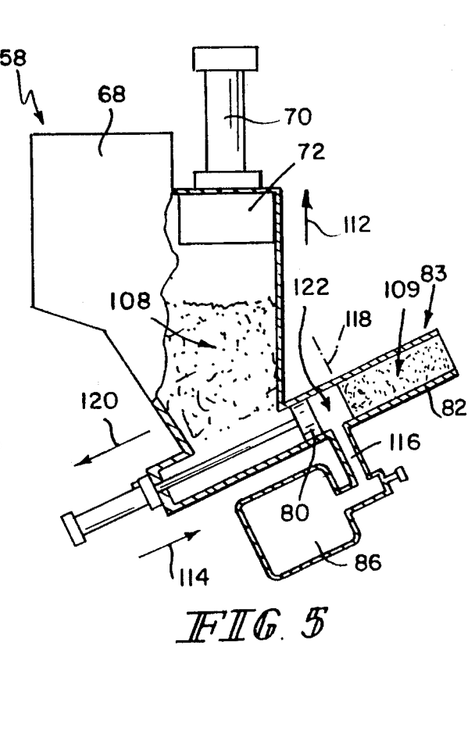
FIG. 5 is a sectional view similar to FIGS. 3 and 4 illustrating the chambering ram of the chambering cylinder in an extended position to load a barrel of the charging apparatus with a supplemental fuel material charge prior to injecting the material charge into the rotary vessel with an air cannon.

As ram 80 is retracted by cylinder 76 in the direction of arrow 120, a void is formed between material charge 109 and ram 80 inside barrel 82 as illustrated at location 122 in FIG. 5. This void 122 permits entry of high energy compressed air from air cannon 86 through inlet 116 and into barrel 82. Ram 80 prevents the compressed air from entering loading hopper 68. Therefore, upon discharge of air cannon 86, the material charge 109 in barrel 82 is driven from barrel 82 at a high velocity in the direction of arrow 114. The material charge 109 passes through open valve 94 and through drop tube 84 into interior region 124 of rotary vessel 16. Timing control for firing the air cannon 86 is controlled by a sensor 126 aligned with a target plate 128 on rotary vessel 16.

It is understood that other drop tubes 130 may be provided for charging additional material charges from charging apparatus 58 and 66. In this instance, each drop tube 84 and 130 can be used by each charging apparatus 58 and 66. Therefore, for each revolution of rotary vessel 16, more than one incremental fuel charge 109 is delivered to interior region 124 of rotary vessel 16. In the case of two charging apparatus 58 and 66 and two drop tubes 84 and 130, four supplemental fuel charges can be delivered during each revolution of rotary vessel 16. If three drop tubes 84 and 130 are used, six material charges 109 can be delivered into interior region 124 during each revolution of rotary vessel 16. For embodiments which include multiple drop tubes 84 and 130, additional sensors 126 and/or target plates 128 are provided for controlling timing of firing air cannons 86 of charging apparatus 58 and 66. Advantageously, such multiple charges of supplemental fuel for each revolution of rotary vessel 16 has a calming effect on operation of kiln 10 compared with dropping a single fuel charge for each revolution of rotary vessel. This may provide smaller peak values for THC and CO levels inside rotary vessel 16.

If needed, an internal target plate or deflector (not shown) can be positioned diametrically opposed to each drop tube 84 and 130 to protect refractory lining 15 of rotary vessel 16. It is also understood that different configurations for drop tubes 84 and 130 may be used. For instance, the open ends of drop tubes 84 and 130 may be curved to direct the material charge 109 and the associated injected air at varying angles into the rotary vessel 16. These angles vary from the angles illustrated in FIG. 2 which are generally perpendicular to a longitudinal axis of rotary vessel 16 to an angle generally parallel to a longitudinal axis of rotary vessel 16.

As the supplemental fuel is charged into the kiln, burning of the supplemental fuel occurs in secondary burning zone 42. This burning of a supplemental fuel in kiln 10 reduces the fuel consumption required by burner 33. It is important that total combustion of the waste derived fuel or other supplemental fuel occurs in order to prevent discharge of solid materials into the atmosphere and to reduce the amount of carbon monoxide discharged into the atmosphere. Carbon monoxide results from incomplete combustion. It is desirable to replace as much of the fuel for firing burner 33 as possible with a supplemental fuel such as solid waste materials charged through charging apparatus 40.

As the supplemental fuel charge 109 of the present invention enters the kiln, it does so with an associated volume of oxygen to assist combustion of the material charge 109. This injected air with the supplemental fuel charge 109 acts as both a tertiary air and a mixing air source. The advantages of such tertiary and mixing air sources are disclosed in U.S. patent application Ser. No. 08/345,314 filed Nov. 28, 1994, owned by the assignee of the present invention and expressly incorporated herein by reference. The air/fuel ratio of the supplemental fuel charge 109 into rotary vessel 16 can be adjusted to optimize system performance.

Mixing of the injected air supplied by air cannons 86 with kiln gases is extremely fast because of the high velocity of the kiln gas stream in the direction of arrows 38 in FIG. 1 and the high velocity of the injected air stream injected with the bulk material fuel charge 109 the direction of arrows 102. In addition, the tertiary air entering rotary vessel 12 will expand rapidly when changing from ambient temperature to kiln temperature.

It is understood that the bulk material charging apparatus 58 and 66 can be used in conjunction with other types of supplemental fuel charging apparatus described above. For instance, the bulk material charging apparatus of the present invention can be used with a conventional containerized supplemental fuel charging apparatus to minimize the amount of containerized supplemental fuel required to be added to the rotary vessel. Again, replacing containerized supplemental fuel with uncontainerized bulk fuel material substantially reduces packaging costs associated with the delivery of supplemental fuel to the kiln.

When implementing the supplemental fuel charging apparatus of the present invention, an operator should keep in mind safety precautions to reduce likelihood of fire or explosion. For example, precautionary measures may include monitoring the conditions inside the interior region of plenum 56 to maintain the interior region of plenum 56 outside explosive limits, placing blowout panels in the plenum housing, installing fire detection devices which shut off charging apparatus 58 and 66 in the event of a fire, enclosing the bulk material handling devices to isolate the devices from ambient, and blanketing the bulk material handling devices with an inert gas, if possible.

Although the invention has been described and defined in detail with reference to certain preferred embodiments, variations and modifications exist within the scope and spirit of the invention as described and claimed in the following claims.

What is claimed is:

1. An apparatus for improved manufacture of cement clinker in a wet or dry process long rotary kiln for processing a mineral material therein to produce cement clinker, said kiln comprising a rotary vessel having a fired lower end and an adjacent clinkering zone, an upper kiln gas exit end and an adjacent mineral drying zone, an intermediate calcining zone along its length, and a kiln gas stream flowing from the fired lower end to the upper gas exit end, the kiln being modified to burn a bulk material supplemental fuel in a secondary burning zone of the kiln, said apparatus comprising:

a port formed in the rotary vessel upstream relative to kiln gas flow of the drying zone;

a tube extending into the rotary vessel in communication with the port to prevent an in-process mineral material in the rotary vessel from escaping through the port; and a bulk material fuel charging apparatus including a hopper for receiving the bulk material, a barrel in communication with the hopper, a cylinder having a piston for moving a ram located within the hopper from a retracted position to an extended position to load a portion of the bulk material into the barrel and form a fuel charge, and an air cannon in air flow communication with the barrel for injecting air into the barrel to force the fuel charge out of the barrel, through the tube, and into an interior region of the rotary vessel.

2. The apparatus of claim 1, further comprising a compaction cylinder coupled to the charging apparatus, the compaction cylinder including a piston and a compaction ram coupled to the piston, the compaction ram being located inside the hopper for compacting the bulk material in the hopper as the compaction ram is moved from a retracted position to an extended position by the compaction cylinder.

3. The apparatus of claim 1, further comprising a stationary annular plenum surrounding rotary vessel, the plenum being configured to define an enclosed interior region in communication with a discharge end of the barrel of the charging apparatus and with the port in the rotary vessel.

4. The apparatus of claim 3, further comprising a storage container located adjacent the kiln for storing the bulk material and a conveyor for transporting the bulk material from the storage container to the hopper of the fuel charging apparatus.

5. The apparatus of claim 4, further comprising a second conveyor for transporting bulk material from inside the annular plenum to the storage container for reloading back into the hopper of the charging apparatus.

6. The apparatus of claim 3, further comprising a fan coupled to the annular plenum and a filter coupled to the fan, the fan withdrawing air from the interior region of the annular plenum through the filter.

7. The apparatus of claim 6, wherein the filter is an activated carbon filter.

8. The apparatus of claim 1, further comprising a target plate coupled to the rotary vessel and a sensor for detecting a position of the target plate to activate the air cannon when the tube is aligned with the barrel of the charging apparatus.

9. The apparatus of claim 1, further comprising a valve coupled to the tube for selectively opening and closing the tube to permit the fuel charge to pass through the tube and into the interior region of the rotary vessel.

10. The apparatus of claim 1, further comprising a second bulk material fuel charging apparatus for charging another fuel charge through the tube during rotation of the rotary vessel.

11. The apparatus of claim 10, further comprising a second port formed in the rotary vessel angularly spaced from the first port, and a second tube extending into the rotary vessel in communication with the second port to provide a second fuel delivery tube for the first and second bulk material fuel charging apparatus.

12. The apparatus of claim 10, wherein the second bulk material fuel charging apparatus includes a second hopper for receiving the bulk material, a second barrel in communication with the second hopper, a second cylinder having a piston for moving a ram located within the second hopper from a retracted position to an extended position to load a portion of the bulk material into the second barrel and form a fuel charge, and a second air cannon in air flow communication with the second barrel for injecting air into the second barrel to force the fuel charge out of the second barrel, through the tube, and into the interior region of the rotary vessel.

13. The apparatus of claim 1, wherein the barrel of the fuel charging apparatus includes an open discharge end, the barrel being angled upwardly to prevent the bulk material from exiting the barrel and hopper through the open discharge end of the barrel.

14. The apparatus of claim 1, wherein the barrel has a predetermined diameter which is smaller than a diameter of the tube.

15. An apparatus for feeding a bulk material supplemental fuel through a port formed in a side wall of a rotary vessel of a cement kiln, the apparatus comprising:

a stationary annular plenum surrounding rotary vessel, the plenum being configured to define an enclosed interior region in communication with the port in the rotary vessel; and a bulk material fuel charging apparatus including a hopper for receiving the bulk material, a barrel in communication with the hopper, the barrel having an open discharge end extending into the interior region of the annular plenum, and an air cannon in air flow communication with the barrel for injecting air into the barrel to force a portion of the bulk material located in the barrel out of the open discharge end of the barrel, through the port, and into the rotary vessel.

16. The apparatus of claim 15, wherein the charging apparatus includes a cylinder coupled to the hopper, the cylinder controlling a piston to move a ram located within the hopper from a retracted position to an extended position to load a portion of the bulk material from the hopper into the barrel to form a fuel charge.

17. The apparatus of claim 16, further comprising a compaction cylinder coupled to the charging apparatus, the compaction cylinder including a piston and a compaction ram coupled to the piston, the compaction ram being located inside the hopper for compacting the bulk material in the hopper as the compaction ram is moved from a retracted position to an extended position by the compaction cylinder.

18. The apparatus of claim 15, further comprising a storage container located adjacent the rotary vessel for storing the bulk material and a conveyor for transporting the bulk material from the storage container to the hopper of the fuel charging apparatus.

19. The apparatus of claim 18, further comprising a second conveyor for transporting bulk material from inside the annular plenum to the storage container for reloading back into the hopper of the charging apparatus.

20. The apparatus of claim 15, further comprising a fan coupled to the annular plenum and a filter coupled to the fan, the fan withdrawing air from the interior region of the annular plenum through the filter.

21. The apparatus of claim 20, wherein the filter is an activated carbon filter.

22. The apparatus of claim 15, further comprising a target plate coupled to the rotary vessel and a sensor for detecting a position of the target plate to activate the air cannon when the port is aligned with the barrel of the charging apparatus.

23. The apparatus of claim 15, further comprising a tube extending into the rotary vessel in communication with the port to prevent an in-process mineral material in the rotary vessel from escaping through the port, and a valve coupled to the tube for selectively opening and closing the tube to permit the portion of the bulk material to pass through the tube and into the rotary vessel.

24. The apparatus of claim 15, further comprising a second bulk material fuel charging apparatus for charging another fuel charge through the port during rotation of the rotary vessel.

25. The apparatus of claim 24, further comprising a second port formed in the rotary vessel angularly spaced from the first port to provide a second fuel delivery port for the first and second bulk material fuel charging apparatus.

26. The apparatus of claim 24, wherein the second bulk material fuel charging apparatus includes a second hopper for receiving the bulk material, a second barrel in communication with the second hopper, the second barrel having an open discharge end extending into the interior region of the annular plenum, and an second air cannon in air flow communication with the second barrel for injecting air into the second barrel to force a portion of the bulk material located in the second barrel out of the open discharge end of the second barrel, through the port, and into the rotary vessel.

27. The apparatus of claim 15, wherein the barrel is angled upwardly to prevent the bulk material from exiting the barrel and hopper through the open discharge end of the barrel.

28. The apparatus of claim 15, wherein the barrel has a predetermined diameter which is smaller than a diameter of the port.

29. A method for improving the manufacture of cement clinker in a conventional long rotary cement kiln comprising a rotary vessel having an upper kiln gas exit end with an adjacent mineral drying zone, and opposite fired clinker exit end with an adjacent clinkering zone and an intermediate mineral calcining zone wherein during operation a kiln gas stream flows from said clinkering zone through the calcining zone and out the kiln gas exit end of the rotary vessel and wherein an in-process mineral flows from the drying zone through the clinkering zone, said method comprising the steps of:

forming a port in the rotary vessel at a predetermined location along a longitudinal axis of the rotary vessel upstream relative to kiln gas flow of the drying zone;

positioning a barrel of a bulk material fuel charging apparatus at said predetermined location aligned with the port;

loading a bulk material into the barrel to form a fuel charge; and supplying high pressure air to the barrel when the port is aligned with the barrel to eject the fuel charge from the barrel, through the port, and into an interior region of the rotary vessel.

30. The method of claim 29, wherein the loading step includes the steps of loading the bulk material into a hopper in communication with the barrel, compacting the bulk material inside the hopper, and forcing a portion of the bulk material from the hopper and into the barrel to form the fuel charge.

31. The method of claim 29, further comprising step of forming an enclosed air chamber surrounding rotary vessel, the enclosed air chamber being in communication with a discharge end of the barrel and with the port formed in the rotary vessel.

32. The method of claim 31, further comprising the step of withdrawing air from the enclosed air chamber through a filter.

33. The method of claim 29, further comprising the step of detecting when the port is aligned with the barrel to control timing of the air supplying step.

34. The method of claim 29, wherein the bulk material is a conventional fossil fuel.

35. The method of claim 29, wherein the bulk material is a combustible waste.

* * * * *